(12) United States Patent
Batchelder

(10) Patent No.: US 10,144,175 B2
(45) Date of Patent: Dec. 4, 2018

(54) ELECTROPHOTOGRAPHY-BASED ADDITIVE MANUFACTURING WITH SOLVENT-ASSISTED PLANARIZATION

(71) Applicant: Evolve Additive Solutions, Inc., Minnetonka, MN (US)

(72) Inventor: J. Samuel Batchelder, Somers, NY (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 601 days.

(21) Appl. No.: 14/218,121

(22) Filed: Mar. 18, 2014

(65) Prior Publication Data

US 2015/0266241 A1     Sep. 24, 2015

(51) Int. Cl.
| | |
|---|---|
| *G03G 15/22* | (2006.01) |
| *B29C 64/188* | (2017.01) |
| *G03G 15/16* | (2006.01) |
| *B33Y 10/00* | (2015.01) |
| *B33Y 30/00* | (2015.01) |

(52) U.S. Cl.
CPC ....... *B29C 64/188* (2017.08); *G03G 15/1625* (2013.01); *G03G 15/224* (2013.01); *B33Y 10/00* (2014.12); *B33Y 30/00* (2014.12)

(58) Field of Classification Search
CPC ............ B29C 67/0085; B29C 67/0074; B29C 64/188; B29C 64/147
See application file for complete search history.

(56) References Cited

U.S. PATENT DOCUMENTS

| | | |
|---|---|---|
| 2,297,691 A | 10/1942 | Carlson |
| 4,988,602 A | 1/1991 | Jongewaard et al. |
| 5,088,047 A | 2/1992 | Bynum |
| 5,099,288 A | 3/1992 | Britto et al. |
| 5,254,421 A | 10/1993 | Coppens et al. |
| 5,354,414 A | 10/1994 | Feygin |
| 5,354,799 A | 10/1994 | Bennett et al. |
| 5,514,232 A | 5/1996 | Burns |
| 5,592,266 A | 1/1997 | Park et al. |

(Continued)

FOREIGN PATENT DOCUMENTS

| | | |
|---|---|---|
| CN | 101310964 A | 11/2008 |
| EP | 0712051 A2 | 5/1996 |

(Continued)

OTHER PUBLICATIONS

International Search Report and Written Opinion dated Jul. 9, 2015 for corresponding International Application No. PCT/US2015/017980, filed Feb. 27, 2015.

(Continued)

*Primary Examiner* — Matthew J Daniels
(74) *Attorney, Agent, or Firm* — Peter J. Ims; Westman, Champlin & Koehler, P.A.

(57) ABSTRACT

An additive manufacturing system and process for printing a three-dimensional part, which includes one or more electrophotography engines configured to develop layers of the three-dimensional part, a printing assembly configured to print the three-dimensional part from the developed layers, and a planarizer configured to conduct solvent-assisted planarizations on intermediate build surfaces of the three-dimensional part after one or more of the developed layers are printed.

16 Claims, 6 Drawing Sheets

(56) References Cited

U.S. PATENT DOCUMENTS

| | | |
|---|---|---|
| 5,593,531 A | 1/1997 | Penn |
| 5,594,652 A | 1/1997 | Penn et al. |
| 5,866,058 A | 2/1999 | Batchelder et al. |
| 5,981,616 A | 11/1999 | Yamamura et al. |
| 5,990,268 A | 11/1999 | Dickens, Jr. et al. |
| 6,052,551 A | 4/2000 | De Cock et al. |
| 6,066,285 A | 5/2000 | Kumar |
| 6,169,605 B1 | 1/2001 | Penn et al. |
| 6,206,672 B1 * | 3/2001 | Grenda ............... B29C 67/0074 264/484 |
| 6,329,115 B1 | 12/2001 | Yamashita |
| 6,376,148 B1 | 4/2002 | Liu et al. |
| 6,492,651 B2 | 12/2002 | Kerekes |
| 6,509,128 B1 | 1/2003 | Everaerts et al. |
| 6,531,086 B1 | 3/2003 | Larsson |
| 6,780,368 B2 | 8/2004 | Liu et al. |
| 6,799,959 B1 | 10/2004 | Tochimoto et al. |
| 6,815,636 B2 | 11/2004 | Chung et al. |
| 6,887,640 B2 | 5/2005 | Zhang et al. |
| 7,011,783 B2 | 3/2006 | Fong |
| 7,077,638 B2 | 7/2006 | Leyden et al. |
| 7,208,257 B2 | 4/2007 | Cheng et al. |
| 7,261,541 B2 | 8/2007 | Fong |
| 7,261,542 B2 | 8/2007 | Hickerson et al. |
| 7,291,242 B2 | 11/2007 | Khoshnevis |
| 7,435,763 B2 | 10/2008 | Farr et al. |
| 7,815,826 B2 | 10/2010 | Serdy et al. |
| 7,988,906 B2 | 8/2011 | Monsheimer et al. |
| 8,047,251 B2 | 11/2011 | Khoshnevis |
| 8,119,053 B1 | 2/2012 | Bedal et al. |
| 8,123,999 B2 | 2/2012 | Priedeman, Jr. et al. |
| 8,124,192 B2 | 2/2012 | Paasche et al. |
| 8,147,910 B2 | 4/2012 | Kritchman |
| 8,173,258 B2 | 5/2012 | Monsheimer et al. |
| 8,216,757 B2 | 7/2012 | Mizutani et al. |
| 8,221,671 B2 | 7/2012 | Hull et al. |
| 8,246,888 B2 | 8/2012 | Hopkins et al. |
| 8,249,480 B2 | 8/2012 | Aslam et al. |
| 8,459,280 B2 | 6/2013 | Swanson et al. |
| 2001/0034197 A1 * | 10/2001 | Dudovicz ............... B24B 21/04 451/168 |
| 2002/0093115 A1 | 7/2002 | Jang et al. |
| 2002/0145213 A1 | 10/2002 | Liu et al. |
| 2003/0087176 A1 | 5/2003 | Ezenyilimba et al. |
| 2004/0119047 A1 * | 6/2004 | Singh ..................... C07C 19/08 252/71 |
| 2004/0173946 A1 | 9/2004 | Pfeifer et al. |
| 2004/0232583 A1 | 11/2004 | Monsheimer et al. |
| 2005/0207801 A1 | 9/2005 | Kunii et al. |
| 2005/0218549 A1 | 10/2005 | Farr et al. |
| 2006/0158456 A1 * | 7/2006 | Zinniel ............... B29C 67/0059 345/589 |
| 2008/0032083 A1 | 2/2008 | Serdy et al. |
| 2008/0169585 A1 | 7/2008 | Zinniel |
| 2008/0169589 A1 | 7/2008 | Sperry et al. |
| 2008/0171284 A1 * | 7/2008 | Hull ..................... B29C 67/0055 430/252 |
| 2008/0226346 A1 | 9/2008 | Hull et al. |
| 2009/0236775 A1 | 9/2009 | Monsheimer et al. |
| 2010/0288194 A1 | 11/2010 | Stockwell et al. |
| 2011/0117485 A1 | 5/2011 | Hermann et al. |
| 2011/0186081 A1 | 8/2011 | Dunn et al. |
| 2011/0190446 A1 | 8/2011 | Matsui et al. |
| 2012/0041132 A1 | 2/2012 | Monsheimer et al. |
| 2012/0139167 A1 | 6/2012 | Fruth et al. |
| 2012/0201960 A1 | 8/2012 | Hartmann et al. |
| 2012/0202012 A1 | 8/2012 | Grebe et al. |
| 2012/0213976 A1 | 8/2012 | Xu et al. |
| 2012/0237870 A1 | 9/2012 | Watanabe et al. |
| 2012/0263488 A1 | 10/2012 | Aslam et al. |
| 2012/0274002 A1 | 11/2012 | Uchida |
| 2013/0077996 A1 | 3/2013 | Hanson et al. |
| 2013/0077997 A1 | 3/2013 | Hanson et al. |
| 2013/0171434 A1 | 7/2013 | Hirth et al. |
| 2013/0186549 A1 | 7/2013 | Comb et al. |
| 2013/0186558 A1 | 7/2013 | Comb et al. |
| 2014/0004462 A1 | 1/2014 | Zaretsky |
| 2014/0167326 A1 | 6/2014 | Jones et al. |

FOREIGN PATENT DOCUMENTS

| | | |
|---|---|---|
| GB | 2446386 A | 8/2008 |
| JP | 5165350 A | 7/1993 |
| JP | 8281808 A | 10/1996 |
| JP | 2001075376 A | 3/2001 |
| JP | 2002347129 A | 12/2002 |
| JP | 2003053849 A | 2/2003 |
| JP | 2003071940 A | 3/2003 |
| JP | 2005062860 A | 3/2005 |
| JP | 2006182813 A | 7/2006 |
| WO | 9851464 A1 | 11/1998 |
| WO | 2007114895 A2 | 10/2007 |
| WO | 2011065920 A1 | 6/2011 |
| WO | 2012034666 A1 | 3/2012 |

OTHER PUBLICATIONS

"Xerography", Aug. 27, 2010, pp. 1-4, http:/en.wikipedia.org/wiki/Xerography.

Jones, Jason, "Selective Laser Printing", Published Prior to Jan. 14, 2013, 1 page.

* cited by examiner

ELECTROPHOTOGRAPHY-BASED ADDITIVE MANUFACTURING WITH SOLVENT-ASSISTED PLANARIZATION

BACKGROUND

The present disclosure relates to additive manufacturing systems and processes for printing three-dimensional (3D) parts and support structures. In particular, the present disclosure relates to planarization techniques for use in additive manufacturing systems building 3D parts and support structures using an imaging process, such as electrophotography.

Additive manufacturing systems (e.g., 3D printers) are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (i.e., xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where toner is applied to charged areas, or alternatively to discharged areas of the photoconductive insulator to form visible images. The formed toner images are then transferred to substrates (e.g., printing paper) and affixed to the substrates with heat and/or pressure.

SUMMARY

An aspect of the present disclosure is directed to an additive manufacturing system and process for printing a 3D part. The system includes one or more electrophotography engines configured to develop layers of the 3D part, and a printing assembly (e.g., a layer transfusion assembly) configured to print the 3D part from the developed layers. The system also includes a planarizer configured to conduct solvent-assisted planarizations on intermediate build surfaces of the 3D part after one or more of the developed layers are printed.

Another aspect of the present disclosure is directed to an additive manufacturing system for printing a 3D part, where the system includes one or more electrophotography engines configured to a develop layer of the 3D part, and a rotatable transfer belt configured to receive the developed layer from the one or more electrophotography engines. The system also includes a build platform, and a nip roller configured to engage with the rotatable transfer belt to press the developed layers into contact with an intermediate build surface of the 3D part on the build platform in a layer-by-layer manner. The system further includes a rotatable planarization belt assembly located downstream from the nip roller, a solvent dispenser configured to dispense a solvent to the rotatable planarization belt assembly, and a gantry configured to move the build platform to engage the 3D part with the nip roller and the rotatable planarization belt.

Another aspect of the present disclosure is directed to a method for printing a 3D part with an additive manufacturing system. The method includes producing a developed layer of a part material with one or more electrophotography engines of the additive manufacturing system, transferring the developed layer from the one or more electrophotography engines to a transfer assembly of the additive manufacturing system, and pressing the developed layer into contact with an intermediate build surface of the 3D part. The method also includes entraining a solvent in a porous substrate of a rotatable planarization assembly, and engaging the 3D part having the pressed layer with the rotatable planarization assembly to planarize the 3D part by solvation and abrasive shearing.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
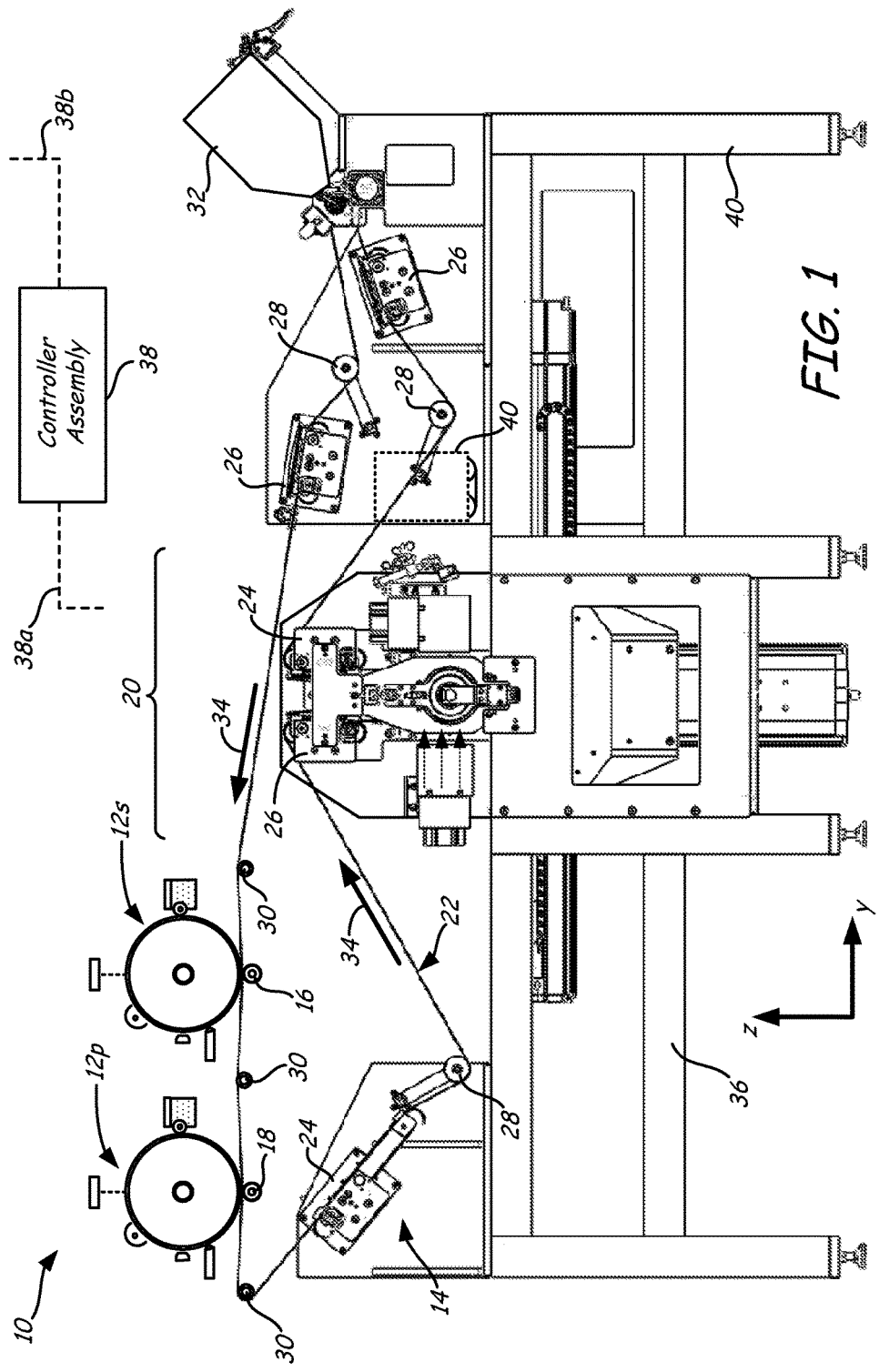
FIG. 1 is a front view of an example electrophotography-based additive manufacturing system for printing 3D parts and support structures with the use of a solvent-assisted planarization technique.

The present disclosure is directed to an electrophotography-based additive manufacturing system and process for printing 3D parts and support structures in a layer-by-layer manner, which incorporates a solvent-assisted planarization technique. During an electrophotography printing operation, one or more electrophotography (EP) engines may develop or otherwise image each layer of part and support materials using an electrophotographic process. The developed layers are then transferred to a layer transfusion assembly where they are transfused (e.g., using heat and/or pressure) to print one or more 3D parts and support structures in a layer-by-layer manner.

As can be appreciated, due to the high resolutions and fast printing speeds, process variations can occur throughout the various stages of the printing operation, such as variations in the triboelectric charge-to-mass (Q/M) ratios and mass per unit area (M/A) values for the developed layers, edge lifting of the printed layers, interference by the interfaces of the part and support materials, part accumulation rate errors, thermal effects at the layer transfusion assembly, potential warping and curling issues, and the like.

These process variations can cumulatively prevent the part and support materials from being printed in precisely the correct amounts and at precisely the correct locations. In addition to potential x-y overlay issues, these process variations can produce printed layers that have topographical error regions, such as hills, valleys, slopes, and the like, which can deviate from the predicted layer heights.

One potential solution to these z-height variations involves physically planarizing the printed layers, such as with a knife-edge planarizer. Physical planarizing is a mechanical process of normalizing the intermediate build surface of a 3D part so that the physical surface corresponds to the layered mathematical model used to drive the printing process. Physical planarizing is conventionally necessary in many 3D printing applications because of the above-discussed process variations. However, physical planarizing can also introduce numerous complexities to the system, such as increased part and support material waste, waste material removal, increased hardware costs, and reduced printing speeds.

Additionally, in the electrophotography-based additive manufacturing process with the layer transfusion step, the printed layers of the 3D part and support structure are exposed to elevated temperatures, which can thermally soften these materials. Therefore, if these thermally-softened materials are subjected to the mechanical shearing of physical planarization, this can potentially result in pull outs of high-resolution features if care is not taken.

As such, the planarization technique discussed herein combines solvation and abrasive shear conditions to normalize the intermediate build surfaces of a 3D part. In addition to increasing z-height control, this planarization technique is found to be suitable for use with thermally-softened materials, and is also believed to increase interlayer bonding due to solvent penetration. This can potentially increase interlayer part strengths.

FIGS. 1-4 illustrate system 10, which is an example electrophotography-based additive manufacturing system for printing 3D parts from a part material, and associated support structures from a support material, and incorporates the planarization technique of the present disclosure. As shown in FIG. 1, system 10 includes a pair of EP engines 12p and 12s, belt transfer assembly 14, biasing mechanisms 16 and 18, and layer transfusion assembly 20. Examples of suitable components and functional operations for system 10 include those disclosed in Hanson et al., U.S. Publication Nos. 2013/0077996 and 2013/0077997, and in Comb et al., U.S. Publication Nos. 2013/0186549 and 2013/0186558.

EP engines 12p and 12s are imaging engines for respectively imaging or otherwise developing layers of the part and support materials from associated digital bitslices. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

The components of system 10 may be retained by one or more frame structures, such as frame 36. Additionally, the components of system 10 are preferably retained within an enclosable housing (not shown) that prevents ambient light from being transmitted to the components of system 10 during operation.

System 10 also includes controller assembly 38 and planarizer 40, where controller assembly 38 is one or more computer-based systems configured to operate the components of system 10 and which may be internal or external to system 10. Controller assembly 38 may include any suitable computer-based hardware, such as user interfaces, memory controllers, processors, storage media, input/output controllers, communication adapters, and a variety of additional components that are contained in conventional computers, servers, media devices, and/or printer controllers. For instance, controller assembly 38 may include one or more computer-processing units configured to operate controller assembly 38 and system 10, such as one or more microprocessor-based engine control systems and/or digitally-controlled raster imaging processor systems.

Controller assembly 38 may communicate over communication line 38a with the various components of system 10, such as EP engines 12p and 12s, belt transfer assembly 14, biasing mechanisms 16 and 18, layer transfusion assembly 20, planarizer 40, and various sensors, calibration devices, display devices, and/or user input devices. Additionally, controller assembly 38 may also communicate over communication line 38b with external devices, such as other computers and servers over a network connection (e.g., a local area network (LAN) connection). While communication lines 38a and 38b are each illustrated as a single signal line, they may each include one or more electrical, optical, and/or wireless signal lines.

Controller assembly 38 may also retain z-height information for each layer printed with system 10 based on a layered mathematical model. For example, as discussed in co-filed U.S. patent application Ser. No. 14/218,084, entitled "Additive Manufacturing With Virtual Planarization Control", controller assembly 38 may retain bitslices corresponding to each printed layer. For each bitslice, controller assembly 38 may also retain a predicted stack height, which corresponds to the z-heights of the printed layers.

Planarizer 40 is a solvent-assisted planarizer located in-line with layer transfusion assembly 20, and is configured to normalize the intermediate build surfaces of a 3D part (and any associated support structure) based on the predicted stack heights retained by controller assembly 38. This arrangement allows planarizer 40 to planarize the 3D part and support structure after one or more layers are printed with layer transfusion assembly 20, as discussed below.

Figure 2:
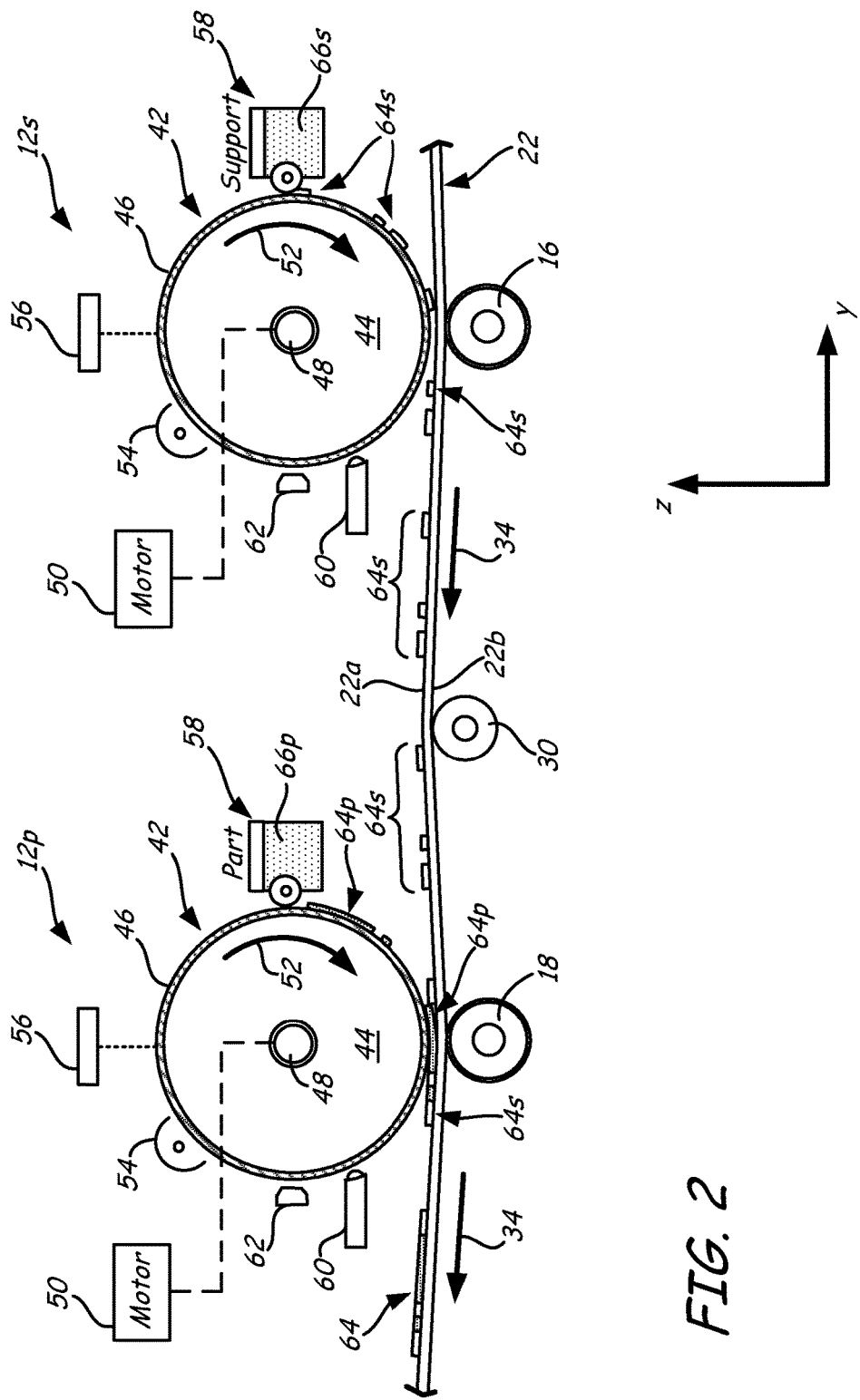
FIG. 2 is a schematic front view of a pair of electrophotography engines of the system for developing layers of the part and support materials.

FIG. 2 illustrates EP engines 12p and 12s, where EP engine 12s (i.e., the upstream EP engine relative to the rotational direction of belt 22) develops layers of the support material, and EP engine 12p (i.e., the downstream EP engine relative to the rotational direction of belt 22) develops layers of the part material. In alternative embodiments, the arrangement of EP engines 12p and 12s may be reversed such that EP engine 12p is upstream from EP engine 12s relative to the rotational direction of belt 22. In further alternative embodiments, system 10 may include three or more EP engines for printing layers of additional materials (e.g., materials of different colors, opacities, and/or functional characteristics).

In the shown embodiment, EP engines 12p and 12s may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of the 3D part or support structure (or negative images), and to attract charged particles of the part or support material of the present disclosure to the charged or discharged image areas, thereby creating the layers of the 3D part or support structure.

As further shown, EP engines 12p and 12s also includes charge inducer 54, imager 56, development station 58, cleaning station 60, and discharge device 62, each of which may be in signal communication with controller assembly 38 over communication line 40a. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12s is used to form layers 64s of the support material (referred to as support material 66s), where a supply of support material 66s may be retained by development station 58 (of EP engine 12s) along with carrier particles. Similarly, the image-forming assembly for surface 46 of EP engine 12p is used to form layers 64p of the part material (referred to as part material 66p), where a supply of part material 66p may be retained by development station 58 (of EP engine 12p) along with carrier particles.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66p or support material 66s, preferably in powder form, along with carrier particles. Development stations 58 may function in a similar manner to single or dual component development systems and toner cartridges used in 2D electrophotography systems. For example, each development station 58 may include an enclosure for retaining the part material 66p or support material 66s and carrier particles. When agitated, the carrier particles generate triboelectric charges to attract the powders of the part material 66p or support material 66s, which charges the attracted powders to a desired sign and magnitude.

Each development station 58 may also include one or more devices for transferring the charged part material 66p or support material 66s to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66p or support material 66s is attracted to the appropriately charged regions of the latent image on surface 46, utilizing either charged area development or discharged area development (depending on the electrophotography mode being utilized).

This creates successive layers 64p or 64s as photoconductor drum 12 continues to rotate in the direction of arrow 52, where the successive layers 64p or 64s correspond to the successive sliced layers of the digital representation of the 3D part or support structure. After being developed, the successive layers 64p or 64s are then rotated with surface 46 in the direction of arrow 52 to a transfer region in which layers 64p or 64s are successively transferred from photoconductor drum 42 to belt 22. While illustrated as a direct engagement between photoconductor drum 42 and belt 22, in some preferred embodiments, EP engines 12p and 12s may also include intermediary transfer drums and/or belts, as discussed further below in FIG. 3.

After a given layer 64p or 64s is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64p or 64s passes cleaning station 60. Cleaning station 60 is a station configured to remove any residual, non-transferred portions of part or support material 66p or 66s. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64p and 64s from photoconductor drum 42 (or an intermediary transfer drum or belt) to layer transfusion assembly 16. Examples of suitable transfer belts for belt 22 include those disclosed in Comb et al., U.S. Publication Nos. 2013/0186549 and 2013/0186558. Belt 22 includes front surface 22a and rear surface 22b, where front surface 22a faces surfaces 46 of photoconductor drums 42 and rear surface 22b is in contact with biasing mechanisms 16 and 18.

Biasing mechanisms 16 and 18 are configured to induce electrical potentials through belt 22 to electrostatically attract layers 64p and 64s from EP engines 12p and 12s to belt 22. Because layers 64p and 64s are each only a single layer increment in thickness at this point in the process, electrostatic attraction is suitable for transferring layers 64p and 64s from EP engines 12p and 12s to belt 22.

Controller assembly 38 preferably rotates photoconductor drums 42 of EP engines 12p and 12s at the same rotational rates that are synchronized with the line speed of belt 22 and/or with any intermediary transfer drums or belts. This allows system 10 to develop and transfer layers 64p and 66s in coordination with each other from separate developer images. In particular, as shown, each part layer 64p may be transferred to belt 22 with proper registration with each support layer 64s to preferably produce a combined or composite part and support material layer 64.

This allows layers 64p and 64s to be transfused together, requiring the part and support materials to have thermal properties and melt rheologies that are similar or substantially the same. As can be appreciated, some layers transferred to layer transfusion assembly 20 may only include support material 66s or may only include part material 66p.

In an alternative embodiment, part layers 64p and support layers 64s may optionally be developed and transferred along belt 22 separately, such as with alternating layers 64p and 64s. These successive, alternating layers 64p and 64s may then be transferred to layer transfusion assembly 20, where they may be transfused separately to print the 3D part and support structure.

Figure 3:
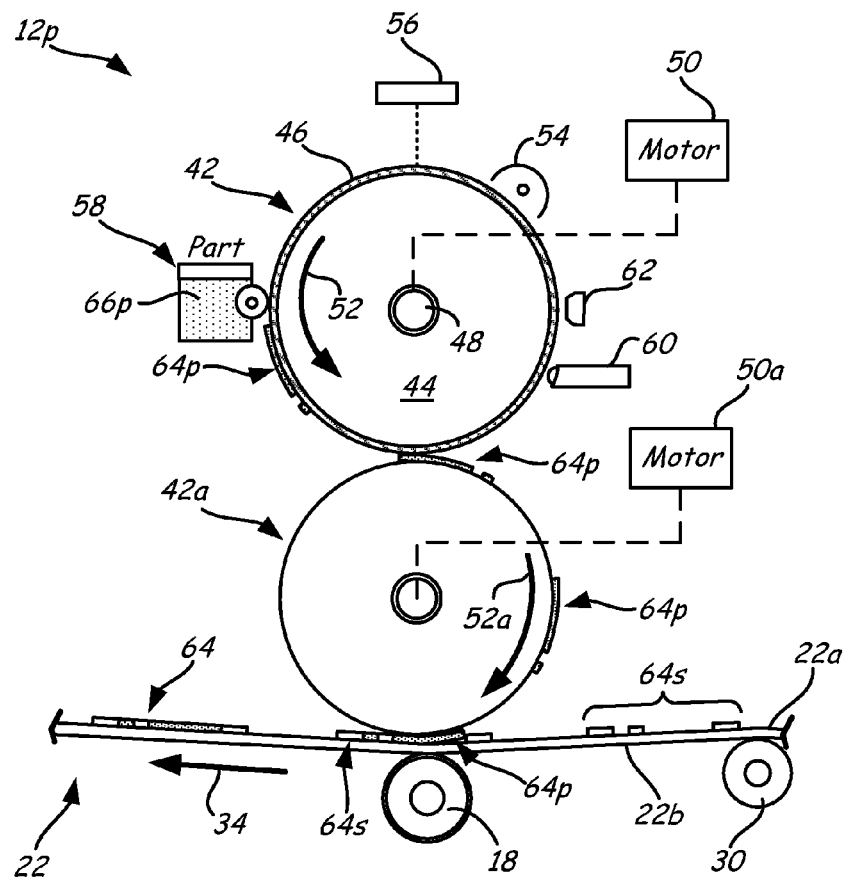
FIG. 3 is a schematic front view of an alternative electrophotography engine, which includes an intermediary drum or belt.

In some embodiments, one or both of EP engines 12p and 12s may also include one or more intermediary transfer drums and/or belts between photoconductor drum 42 and belt 22. For example, as shown in FIG. 3, EP engine 12p may also include intermediary drum 42a that rotates an opposing rotational direction from arrow 52, as illustrated by arrow 52a, under the rotational power of motor 50a. Intermediary drum 42a engages with photoconductor drum 42 to receive the developed layers 64p from photoconductor drum 42, and then carries the received developed layers 64p and transfers them to belt 22.

EP engine 12s may include the same arrangement of intermediary drum 42a for carrying the developed layers 64s from photoconductor drum 42 to belt 22. The use of such intermediary transfer drums or belts for EP engines 12p and 12s can be beneficial for thermally isolating photoconductor drum 42 from belt 22, if desired.

Figure 4:
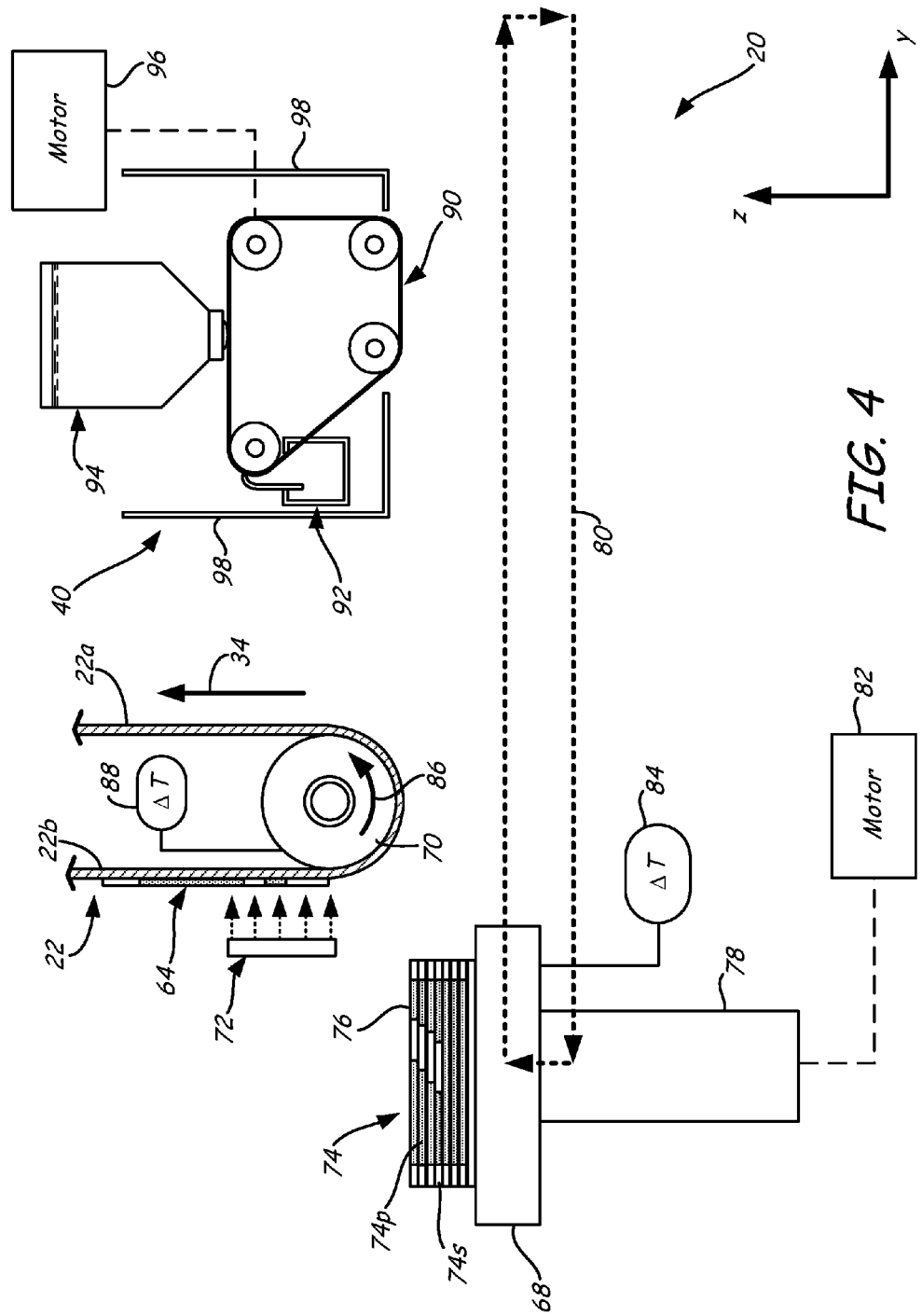
FIG. 4 is a schematic front view of a layer transfusion assembly of the system in use with a planarizer of the system.

FIG. 4 illustrates an example embodiment for layer transfusion assembly 20 in use with planarizer 40. As shown, layer transfusion assembly 20 is an example printing assembly that includes build platform 68, nip roller 70, and heater 72. A suitable operation of layer transfusion assembly 20 is discussed in Comb et al., U.S. Publication Nos. 2013/0186549 and 2013/0186558. In alternative embodiments, layer transfusion assembly 20 may also optionally include one or more additional pre-heaters, one or more post-heaters, one or more air jets (or other cooling units), and/or other arrangements (e.g., press plates, multiple rollers, etc. . . . ), as also described in Comb et al., U.S. Publication Nos. 2013/0186549 and 2013/0186558.

Build platform 68 is a platform assembly or platen of system 10 that is configured to receive the heated combined layers 64 (or separate layers 64p and 64s) for printing a 3D part and support structure, referred to as 3D part 74p and support structure 74s, in a layer-by-layer manner. For ease of discussion, 3D part 74p and support structure 74s are herein referred to collectively as 3D part 74, which has an intermediate build surface 76 on which a subsequent layer 64 can be applied onto.

In some embodiments, build platform 68 may include removable film substrates (not shown) for receiving the printed layers 64, where the removable film substrates may be restrained against build platform using any suitable technique (e.g., vacuum drawing, removable adhesive, mechanical fastener, magnetic attraction, and the like). Build platform 68 is supported by gantry 78, which is a gantry mechanism configured to move build platform 68 along the z-axis and the y-axis, preferably to produce a reciprocating rectangular pattern, where the primary motion is back-and-forth along the y-axis (illustrated by broken lines 80).

While the reciprocating rectangular pattern is described as a rectangular pattern with sharp axial corners (defined by arrows 80), gantry 78 may move build platform 68 in a reciprocating rectangular pattern having rounded or oval-defining corners, so long as build platform 68 moves along the y-axis during the pressing steps. Gantry 80 may be operated by motor 82 based on commands from controller assembly 38, where motor 82 may be an electrical motor, a hydraulic system, a pneumatic system, or the like. In the shown embodiment, build platform 68 is heatable with heating element 84 (e.g., an electric heater), which is configured to heat and maintain build platform 68 at a desired elevated temperature.

Nip roller 70 is an example heatable element or heatable layer transfusion element, which is configured to rotate around a fixed axis with the movement of belt 22. In particular, nip roller 70 may roll against rear surface 22b in the direction of arrow 86 while belt 22 rotates in the direction of arrow 34. In the shown embodiment, nip roller 70 is heatable with heating element 88 (e.g., an electric heater). Heating element 86 is configured to heat and maintain nip roller 70 at a desired elevated temperature.

Heater 72 is one or more heating devices (e.g., an infrared heater and/or a heated air jet) configured to heat layers 64 to a desired elevated temperature prior to reaching nip roller 70. Each layer 64 desirably passes by (or through) heater 72 for a sufficient residence time to heat the layer 64 to the desired elevated temperature. In some embodiments, heater 72 may be a pre-sintering heater, such as disclosed in co-filed U.S. patent application Ser. No. 14/218,102, entitled "Electrophotography-Based Additive Manufacturing With Pre-Sintering.

The desired elevated temperatures mentioned above may be independently selected and preset temperatures for transfusing the layers 64 together to build surfaces 76 of 3D part 74. Examples of suitable desired elevated temperatures for each step in layer transfusion assembly 20 include those discussed in Comb et al., U.S. Publication Nos. 2013/0186549 and 2013/0186558; and in co-filed U.S. patent application Ser. No. 14/218,102, entitled "Electrophotography-Based Additive Manufacturing With Pre-Sintering.

During the printing operation, belt 22 carries a layer 64 past heater 72, which may heat the layer 64 and the associated region of belt 22 to the desired elevated temperature. Along with the rotation of belt 22, gantry 78 may move build platform 68 to align build surface 76 with the incoming layer 64 on belt 22, preferably with proper overlay in the x-y plane. Gantry 78 may continue to move build platform 68 along the y-axis, at a rate that is synchronized with the rotational rate of belt 22 in the direction of arrow 34 (i.e., the same directions and speed). This causes rear surface 22b of belt 22 to rotate around nip roller 70 to nip belt 22 and the layer 64 against build surface 76 of 3D part 74.

This accordingly presses the layer 64 between build surface 76 of 3D part 74 at the location of nip roller 70 to preferably press the layer 76 into intimate contact with build surface 76. As the applied layer 64 passes the nip of nip roller 70, belt 22 wraps around nip roller 70 to separate and disengage from build platform 68. This assists in releasing the applied layer 64 from belt 22, allowing the applied layer 64 to remain adhered to 3D part 74. After release, gantry 78 continues to move build platform 68 along the y-axis to planarizer 40.

Figure 5:
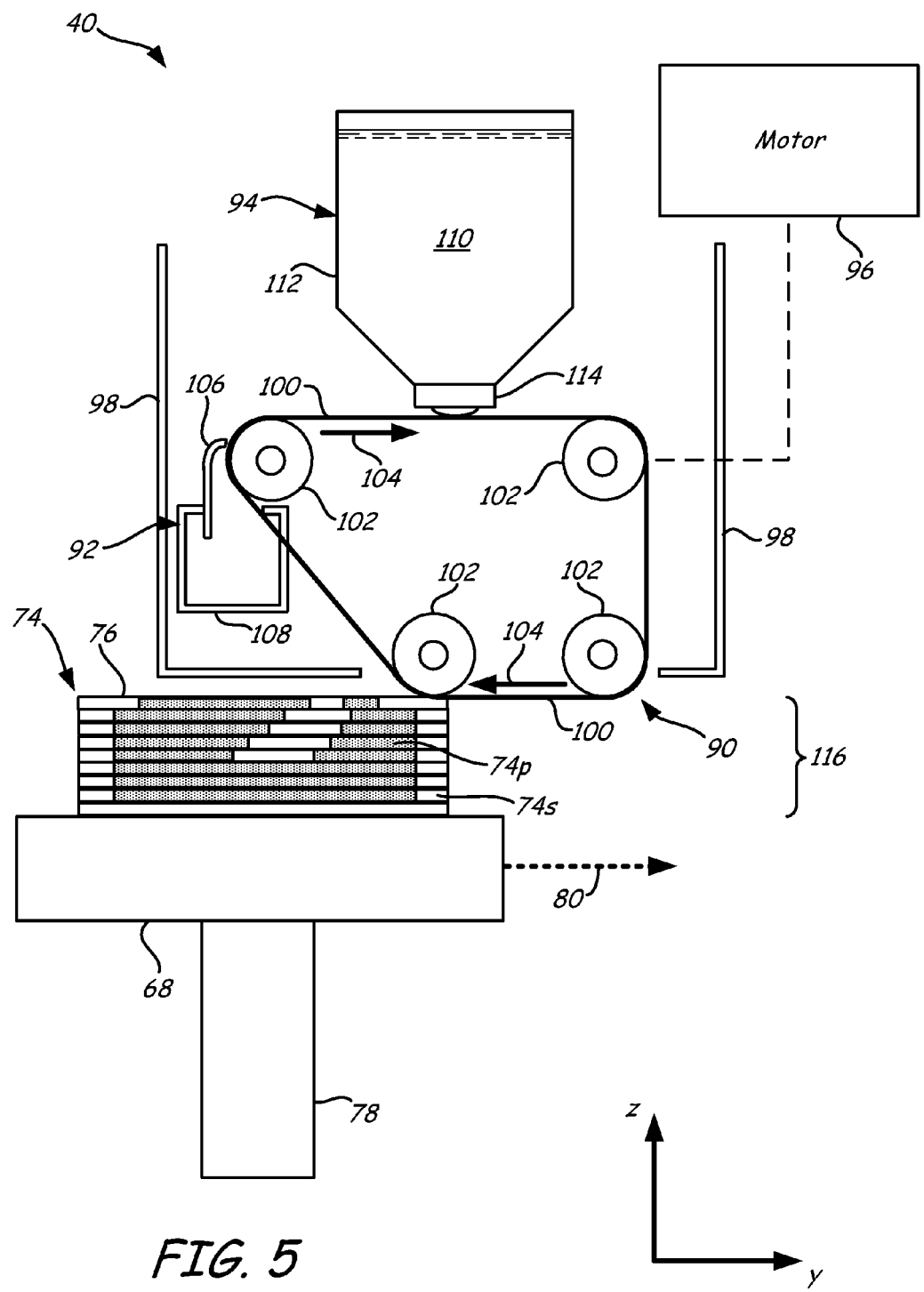
FIG. 5 is an expanded schematic front view of the planarizer.

As shown in FIGS. 4 and 5, planarizer 40 includes belt assembly 90, collection unit 92, solvent applicator 94, motor 96, and housing 98, where housing 98 is a casing configured to protect the components of planarizer 40, and is preferably located above the contact location between 3D part 76 and belt assembly 90. In other words, as shown, at least a portion of belt assembly 90 extends below housing 98.

As best shown in FIG. 5, belt assembly 90 includes planarizing belt 100 and rollers 102, where rollers 102 are a set of drive and/or idler rollers that maintain tension on belt 100. One or more of rollers 102 are driven by motor 96 to rotate belt 100 in the direction of arrows 104 that, in the shown embodiment, is opposite of the movement direction of build platform 68 (along arrow 80).

Belt 100 is preferably a porous belt that is configured to contact build surfaces 76 of 3D part 74 between one or more printing steps to normalize the z-heights to the predicted stack heights retained by controller assembly 38. For example, belt 100 may be fabricated from one or more fiber and/or polymeric materials having a porous structure. Suitable polymeric materials include foamable polymeric materials, such as polyurethane, and the like. In some embodiments, belt 100 may be a multi-layer belt, where at least the surface layer in contact with 3D part 76 is porous.

Collection unit 92 includes wiper 106 and receptacle 108, where wiper 106 is preferably positioned to lightly contact belt 100, allowing wiper 106 to remove any excess material accumulated on belt 100. The removed material may then be directed to receptacle 108 for temporary storage during a printing operation.

Solvent applicator 94 is an apparatus configured to store and dispense solvent 110 in a metered manner onto belt 100 at a location that is preferably downstream from collection unit 92 (in the rotational direction of arrows 104). As shown, solvent applicator 94 may include a reservoir container 112 for retaining a supply of solvent 110, and a dispenser 114 that meters out or otherwise controllably dispenses solvent 110 from reservoir container 112 to belt 100.

Reservoir container 112 is an interchangeable or fillable container for retaining solvent 110 in an enclosed manner to prevent solvent 110 from evaporating during storage. Dispenser 114 may by any suitable metering mechanism coupled to an outlet end of reservoir container 112. In some embodiments, dispenser 114 may be a gravity dispenser, such as a drip applicator or roll-on applicator, which meters out preset volumes of solvent 110 under gravity and contact with belt 100. Alternatively, dispenser 114 may incorporate an electronically-actuatable valve that meters out solvent 110 based on preset dispensing controls (e.g., from controller assembly 38).

The dispensed solvent 110 becomes entrained in the porous structure of belt 100, allowing the solvent 110 to be carried by belt 100 while rotating. The dispensing rate from dispenser 114 and the concentration or volume of solvent 100 retained by belt 100 may vary depending on the particular solvent 110 utilized, the part and support materials used for 3D part 74, and the contact duration between planarizing belt 100 and 3D part 74.

The particular composition for solvent 110 may also vary depending on the part and support materials used for 3D part 74. Preferably, solvent 110 has a balanced free energy of solvation with the part and support materials such that the part and support materials can dissolve into solvent 110 at a suitable rate that is not too aggressive nor too slow. Additionally, solvent 110 is preferably non-residue forming to prevent residue contamination in 3D part 74. Moreover, for handling purposes, solvent 110 is preferably non-flammable and environmentally friendly (e.g., non-ozone depleting).

Examples of suitable solvents 110 for use with planarizer 40 include halogenated hydrocarbons, acetone, ethyl acetate, methyl ethyl ketone, dimethylacetamide, n-methyl-2-pyrrolidone, $C_1$-$C_5$ alcohols, xylene, toluene, water, and more preferably blends thereof that reduce or prevent flammability and environmental concerns. Suitable halogenated hydrocarbons include methylene chloride, dichloroethylene, trichloroethylene, perchloroethylene, n-propyl bromide, fluorinated hydrocarbons, and blends thereof.

Preferred solvents 110 for use with planarizer 40 include halogenated hydrocarbons, such as fluorinated hydrocarbons (e.g., hydrofluoroolefins) and/or chlorinated hydrocarbons that are non-flammable, non-ozone depleting, and non-residue forming. The term "non-ozone depleting" refers to a substance having an ozone depletion protocol 1 (ODP1) under the Montreal Protocol of less than 0.1, more preferably of less than 0.05, and even more preferably of less than 0.01. Examples of preferred halogenated hydrocarbons include specialty fluids commercially available under the tradename "VERTREL" from E. I. du Pont de Nemours and Company, Wilmington, Del.

As shown in FIG. 5, controller assembly 28 preferably commands gantry 78 to position build platen 68 at a z-height such that a gap 116 between the lower planar portion of belt 100 and the top surface of build platen 68 corresponds to the z-height of the predicted stack height for the current layer 64.

As belt 100 continues to rotate in the direction of arrows 104, gantry 78 moves build platen 38 and 3D part 74 in the direction of arrow 80 until the build surface 76 reaches the leading edge of belt 100. At this point, the continued movement of build platen 38 and 3D part 74 in the direction of arrow 80 moves build surface 76 into contact with the counter-rotating belt 100. This contact abrasively removes any material that extends above the height of gap 116 under shear.

Additionally, solvent 110 may partially diffuse from the porous structure of belt 100 into the top one or more layers of 3D part 74, thereby partially solvating the material build surface 76. This accordingly allows the abrasive shear forces generated between belt 100 and build surface 76 to be significantly lower than what is otherwise required with mechanical planarizers (e.g., knife-edge planarizers). This lower abrasive shear protects fine-feature details of 3D part 76 from being pulled out or distorted.

Additionally, the use of lower abrasive shear forces allows thinner cuts to be made with belt 100. In effect, belt 100 performs an action that is more comparable to wiping or polishing than cutting. This reduces the thickness of 3D part 74 that is removed during each planarization step compared to conventional mechanical planarizers. This correspondingly reduces the amount of overprinting that system 10 is otherwise required to perform. As can be appreciated, this can save printing time and reduce material consumption rates.

The solvent penetration of solvent 110 into the top layer(s) of 3D part 74 is also believed to increase the interlayer bonds due material reflow effects. This can increase reptation of the polymer molecules by increasing their mobility.

As 3D part 74 moves across belt 100, any removed materials may be captured by the solvent 110 retained in the porous structure of belt 100, and be carried away with the rotation of belt 100. These materials may then be removed at collection unit 92, as discussed above. This preferably cleans belt 100 in a manner that minimizes the loss of the entrained solvent 110.

After passing planarizer 40, gantry 78 may then actuate build platform 68 downward, and move build platform 68 back along the y-axis to a starting position along the y-axis, following the reciprocating rectangular pattern 80. The residual amounts of solvent 110 that diffused into 3D part 74 may evaporate at this point, which can assist in actively cooling the top layers of 3D part 74 down to a desired average part temperature. This preferably keeps 3D part 74 at the average part temperature as also discussed in Comb et al., U.S. Publication Nos. 2013/0186549 and 2013/0186558, potentially without requiring additional cooling units (e.g., air jets).

Following pattern 80, build platform 68 desirably reaches the starting position for proper registration with the next layer 64. The newly-planarized build surface 76 is then ready for receiving the next layer 64 in the same manner as discussed above. In some embodiments, gantry 84 may also actuate build platform 68 and 3D part 80/support structure 82 upward for proper overlay with the next layer 64. The same process may then be repeated for each remaining layer 64 of 3D part 80 and support structure 82.

FIGS. 4 and 5 illustrate a suitable arrangement for planarizer 40, where belt 100 counter-rotates relative to the movement direction of build platen 68 and 3D part 74 in the direction of arrow 80. In this embodiment, belt 100 contacts build surface 76 of 3D part 74 across a lower planar portion between the lower-most rollers 102.

Figure 6:
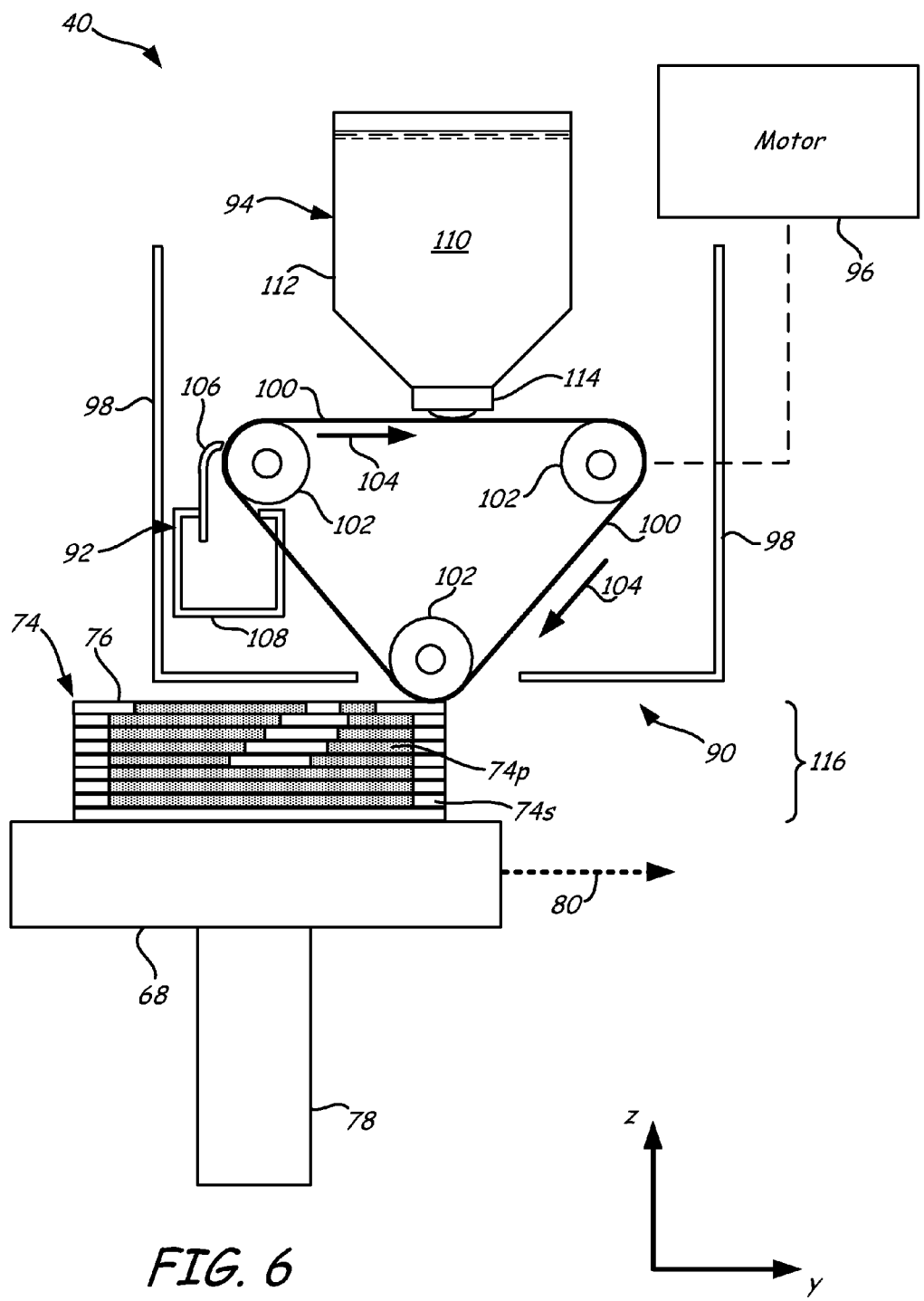
FIG. 6 is an expanded schematic front view of an alternative planarizer.

In an alternative embodiment, as shown in FIG. 6, belt 100 may contact build surface 76 of 3D part 74 around a roller 102. This embodiment may function in the same manner as discussed above, where the nip pressure between the roller 102 and build surface 76 may potentially be more closely controlled. In yet a further alternative embodiment, belt assembly 90 may be replaced with other rotatable assemblies that planarize build surface 76 of 3D part 74, such as a rotatable drum having a porous surface, which may function in the same manner as belt assembly 90.

Moreover, the solvent-assisted planarization technique may be used in combination with a virtual planarization technique, such as the technique disclosed in co-filed U.S. patent application Ser. No. 14/218,084, entitled "Additive Manufacturing With Virtual Planarization Control". For example, system 10 may also include one or more z-height sensors (e.g., imaging sensors) located upstream and/or downstream of planarizer 40. This combination can provide further planarization control during the printing operation with system 10.

Although the present disclosure has been described with reference to preferred embodiments, workers skilled in the art will recognize that changes may be made in form and detail without departing from the spirit and scope of the disclosure.

The invention claimed is:

1. An electrophotography-based additive manufacturing system for printing a three-dimensional part, the electrophotography-based additive manufacturing system comprising:
   one or more imaging engines configured to develop layers of powder part material of the three-dimensional part;
   a printing assembly configured to print the three-dimensional part from the developed layers utilizing heat and pressure; and
   a planarizer comprising:
      a plurality of rollers;
      a belt retained by the plurality of rollers, wherein the belt comprises a porous substrate configured to accept and retain a liquid solvent;
      a solvent dispenser configured to transfer a hydrocarbon based liquid solvent onto intermediate build surfaces of the three-dimensional part after one or more of the developed layers are printed wherein the liquid solvent softens the printed material and wherein the planarizer is configured to apply pressure to flatten a softened top surface of the intermediate build surfaces.

2. The electrophotography-based additive manufacturing system of claim 1, wherein the hydrocarbon based liquid comprises a fluorinated hydrocarbon liquid solvent.

3. The electrophotography-based additive manufacturing system of claim 1, wherein the printing assembly comprises:

a heater configured to heat the developed layers;

a build platform; and a pressing element configured to engage with the transfer assembly to press the heated developed layers into contact with the intermediate build surfaces of the three-dimensional part on the build platform in a layer-by-layer manner.

4. The electrophotography-based additive manufacturing system of claim 3, wherein the pressing element comprises a nip roller, and wherein the planarizer is located downstream from the nip roller.

5. An electrophotography-based additive manufacturing system for printing a three-dimensional part, the electrophotography-based additive manufacturing system comprising:

one or more imaging engines configured to a develop layer of the three-dimensional part;

a rotatable transfer belt configured to receive the developed layer from the one or more imaging engines;

a build platform;

a nip roller configured to engage with the rotatable transfer belt to press the developed layers into contact with an intermediate build surface of the three-dimensional part on the build platform in a layer-by-layer manner;

a rotatable planarization belt assembly located downstream from the nip roller;

a solvent dispenser configured to dispense a hydrocarbon based liquid solvent to the rotatable planarization belt assembly to transfer the hydrocarbon based liquid solvent onto intermediate build surfaces of the three-dimensional part being printed wherein the hydrocarbon based liquid solvent softens at least an upper surface of the intermediate build surfaces and wherein the rotatable planarization belt is configured to apply pressure to the upper surface such that the upper surface of the intermediate build surfaces is flattened; and a gantry configured to move the build platform to engage the three-dimensional part with the nip roller and the rotatable planarization belt.

6. The electrophotography-based additive manufacturing system of claim 5, and further comprising a heater configured to heat the developed layers on the rotatable transfer belt.

7. The electrophotography-based additive manufacturing system of claim 5, wherein the rotatable planarization belt comprises a porous substrate.

8. The electrophotography-based additive manufacturing system of claim 5, wherein the hydrocarbon based liquid solvent comprises a halogenated hydrocarbon liquid solvent.

9. The electrophotography-based additive manufacturing system of claim 8, wherein the hydrocarbon based liquid solvent comprises a fluorinated hydrocarbon liquid solvent.

10. The electrophotography-based additive manufacturing system of claim of claim 5, wherein the rotatable planarization belt is configured to move in an opposing rotational direction relative to a movement direction of the build platform.

11. A method for printing a three-dimensional part with an electrophotography-based additive manufacturing system, the method comprising:

producing a developed layer of a part material with one or more imaging engines of the electrophotography-based additive manufacturing system;

transferring the developed layer from the one or more imaging engines to a transfer assembly of the electrophotography-based additive manufacturing system;

pressing the developed layer into contact with an intermediate build surface of the three-dimensional part;

entraining a hydrocarbon based liquid solvent in a porous substrate of a rotatable planarization assembly for transferring the liquid solvent onto intermediate build surfaces of the three-dimensional part after one or more of the developed layers are printed to soften at least a top surface of the intermediate build surface; and engaging the three-dimensional part having the pressed layer with the rotatable planarization assembly comprising:

a plurality of rollers;

a belt retained by the plurality of rollers, wherein the belt comprises a porous substrate configured to accept and retain a liquid solvent to apply pressure to the top surface and planarize the three-dimensional part by solvation and abrasive shearing.

12. The method of claim 11, and further comprising heating the developed layer at the transfer assembly.

13. The method of claim 11, wherein engaging the three-dimensional part having the pressed layer with the rotatable planarization assembly comprises:

moving the three-dimensional part in a first linear direction; and rotating the rotatable planarization belt in a direction that is opposite of the first linear direction.

14. The method of claim 11, wherein the solvation causes a portion of the liquid solvent to penetrate into the three-dimensional part.

15. The method of claim 11, wherein the liquid solvent comprises a fluorinated hydrocarbon.

16. The method of claim 11, and further comprising evaporating a portion of the liquid solvent off from the planarized three-dimensional part.

* * * * *